(12) United States Patent
Elliott, IV et al.

(10) Patent No.: US 10,191,958 B1
(45) Date of Patent: *Jan. 29, 2019

(54) STORAGE PROVISIONING IN A DATA STORAGE ENVIRONMENT

(71) Applicant: EMC IP Holding Company LLC, Hopkinton, MA (US)

(72) Inventors: William J Elliott, IV, Holden, MA (US); Anoop G. Ninan, Milford, MA (US); Evgeny Roytman, Sharon, MA (US); Thomas L. Watson, Richardson, TX (US); Ameer Jabbar, Lilburn, GA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/497,893

(22) Filed: Apr. 26, 2017

Related U.S. Application Data

(63) Continuation of application No. 13/886,687, filed on May 3, 2013, now Pat. No. 9,658,797.

(51) Int. Cl.
*G06F 11/14* (2006.01)
*G06F 17/30* (2006.01)

(52) U.S. Cl.
CPC .... *G06F 17/30575* (2013.01); *G06F 11/1464* (2013.01); *G06F 2201/84* (2013.01)

(58) Field of Classification Search
None
See application file for complete search history.

(56) References Cited

U.S. PATENT DOCUMENTS 8,479,211 B1 * 7/2013 Marshall ................ G06F 11/14
707/770

OTHER PUBLICATIONS

EMC Replication Manager and EMC Recoverpoint, White Paper, p. 1-35, Apr. 2012.*

* cited by examiner

*Primary Examiner* — Prasith Thammavong
*Assistant Examiner* — Edmund H Kwong
(74) *Attorney, Agent, or Firm* — Krishnendu Gupta; Deepika Bhayana

(57) ABSTRACT

A system, method, and computer program product for storage provisioning in a data storage environment comprising protecting, through an orchestration API, a source volume at a source site by setting the source volume to be replicated to a target volume at a target site through the use of a replication appliance; wherein the API is enabled to create network zones between the source site and the target site for replication from the source site to the target site and wherein the network zone is configured to include the replication appliance; wherein the API is enabled to mask storage devices used to store data on the source volume and the target volume.

18 Claims, 12 Drawing Sheets

STORAGE PROVISIONING IN A DATA STORAGE ENVIRONMENT

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

RELATED APPLICATIONS

This Application is related to U.S. patent application Ser. No. 13/630,455 entitled "SINGLE CONTROL PATH" filed on Sep. 28, 2012, Ser. No. 13/631,030 entitled "METHOD AND APPARATUS FOR FEDERATING A PLURALITY OF ONE BIG ARRAYS" filed on Sep. 28, 2012, Ser. No. 13/631,039 entitled "METHOD AND APPARATUS FOR AUTOMATED INFORMATION LIFECYCLE MANAGEMENT USING A FEDERATION OF ARRAYS" filed on Sep. 28, 2012, Ser. No. 13/631,055 entitled "METHOD AND APPARATUS FOR FEDERATED IDENTITY AND AUTHENTICATION SERVICES" filed on Sep. 28, 2012, Ser. No. 13/631,190 entitled "APPLICATION PROGRAMMING INTERFACE" filed on Sep. 28, 2012, Ser. No. 13/631,214 entitled "AUTOMATED POLICY BASED SCHEDULING AND PLACEMENT OF STORAGE RESOURCES" filed on Sep. 28, 2012, Ser. No. 13/631,246 entitled "DISTRIBUTED SYSTEM SOFTWARE INFRASTRUCTURE", filed on Sep. 28, 2012, and Ser. No. 13/886,786 entitled "DISTRIBUTED WORKFLOW MANAGER" filed on even date herewith, Ser. No. 13/886,789 entitled "PORT PROVISIONING SYSTEM" filed on even date herewith, Ser. No. 13/886,892 entitled "SCALABLE INDEX STORE" filed on even date herewith, Ser. No. 13/886,915 entitled "SCALABLE OBJECT STORE" filed on even date herewith, and Ser. No. 13/886,644 entitled "STORAGE PROVISIONING IN A DATA STORAGE ENVIRONMENT" filed on even date herewith, which are hereby incorporated herein by reference in their entirety.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, at the hypervisor level or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A system, method, and computer program product for storage provisioning in a data storage environment comprising protecting, through an orchestration API, a source volume at a source site by setting the source volume to be replicated to a target volume at a target site through the use of a replication appliance; wherein the API is enabled to create network zones between the source site and the target site for replication from the source site to the target site and wherein the network zone is configured to include the replication appliance; wherein the API is enabled to mask storage devices used to store data on the source volume and the target volume.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
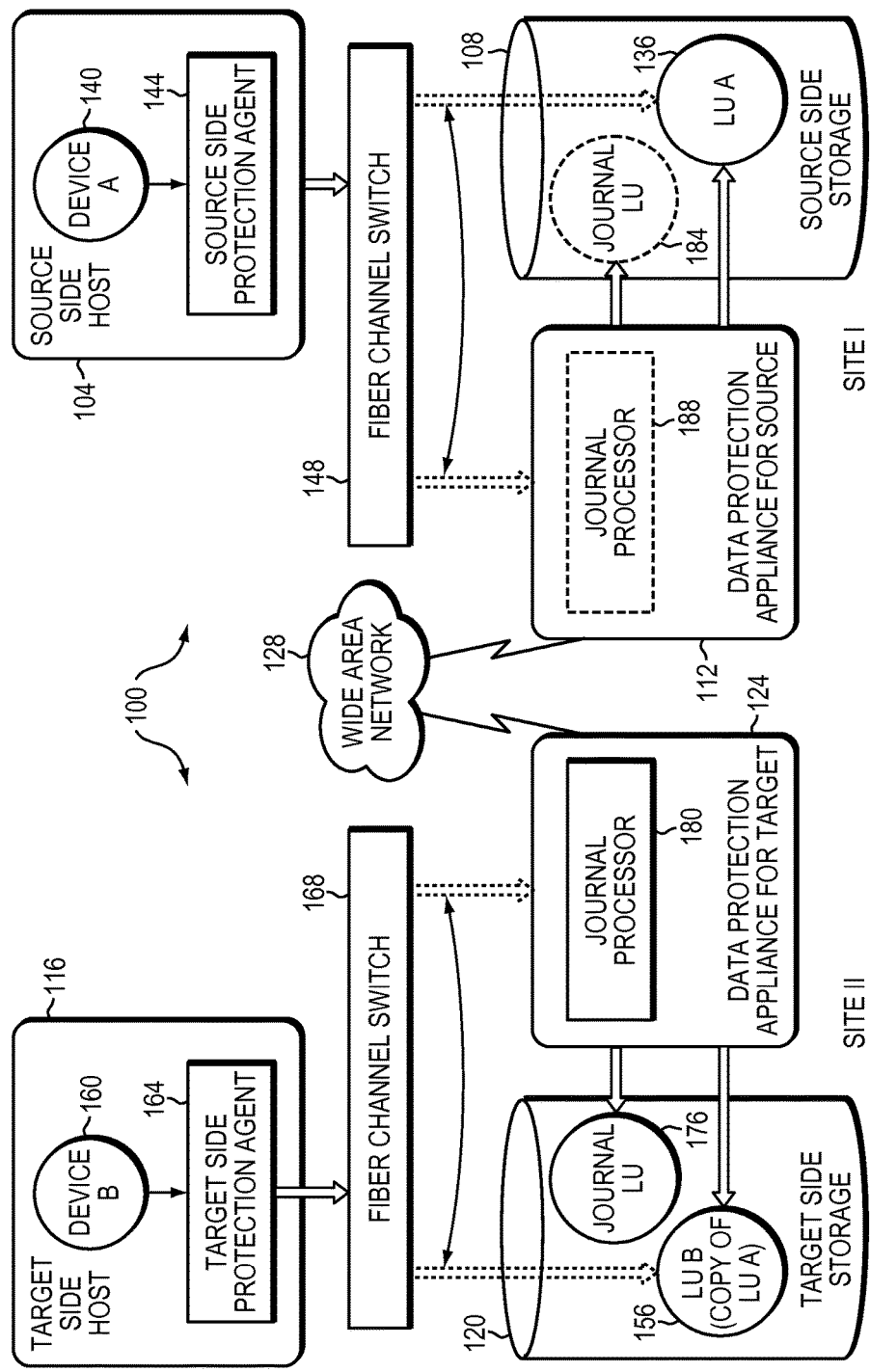
FIG. 1 is a simplified illustration of a data protection system, in accordance with an embodiment of the present disclosure.

Typically, storage (or data) protection is provided by any of a series of technologies that makes a copy of an original set of data to target devices. Generally, the copy of the data may be used if an event such as data failure occurs such as, for example, when the original copy of data is destroyed, corrupted, or otherwise unavailable. Conventionally, different strategies may be used to provide data protection for different types of failures that can occur. Usually, some strategies are continuous (source and targets are kept in sync), while others are simply refreshed periodically.

Current solutions to deploy such data protection strategies are predominantly documented procedures that must be executed by an IT professional each time a request for new storage is submitted. Similarly, typical clean-up of such resources is also a documented procedure, but is conventionally neglected until storage or protection resources become scarce. Usually, partially automated solutions to parts of the strategy are sometimes written in the form of executable scripts that are built in-house or by a service professional that is tailor-made to the specific infrastructure and needs of the datacenter. Generally, the solutions are difficult to maintain and inflexible to the constantly-changing datacenter.

In certain embodiments, the current disclosure may enable creation of an ecosystem of centralized global datacenter management, regardless of the storage manufacturer, protocol, and geographic disparity. In some embodiments, an IT professional may be enabled to configure a datacenter to leverage a unified management platform to perform various tasks via one interface, such as a web portal, without having to use different element managers or CLIs. In certain embodiments, an API may be enabled that can automatically create a protected storage volume on a source site replicated on a target volume on a target site.

Conventionally, a request to create a new two terabyte volume replicated volume, there may be twenty-four steps for a typical IT administrator. Conventional techniques also may require manipulation of several different APIs (Solutions Enabler API, switch) and GUIs.

In most embodiments, the current disclosure enables the process of creating a replicated volume with a simple set of input. In some embodiments, the inputs may include such as where the volume should exist and how the volume should be protected. In at least some embodiments, an orchestration API is enabled to discover which replication appliances are connected to which storage arrays. In other embodiments, an orchestration API may be able to determine what storage arrays or storage pools are able to satisfy which storage requests. In further embodiments, an orchestration API may be able to create volumes to satisfy a storage request sent to the storage array. In at least some embodiments, creating volumes may include creating a volume at both the source and target site as well as creating supplemental volumes, such as journal volumes, for replication. In certain embodiments, the API may orchestrate creating zones for storage arrays and replication appliances. In other embodiments, the orchestration SPI may be enabled to mask created volumes to a respective replication appliance cluster node. In still other embodiments, the orchestration API may create consistency groups for the replication appliance.

In some embodiments, the functionality orchestrated by the orchestration API may be performed in parallel. In other embodiments, cluster load-balancing within the logical array cluster may be enabled. In a particular embodiment, when creating 20 volumes, the request to create each volume may occur in parallel. In most embodiments, the orchestration of each sub-step may be carried out in an order-dependent and efficient way. In most embodiments, this may ensure the source volume(s) is created in an efficient manner.

In other embodiments, system configuration may be enabled to provide data protection in an automated fashion without requiring a user to specify the details of such a configuration. In most embodiments, a user may define operational and service requirements and the techniques of the current disclosure may enable the system to be configured to meet the user's operational and service requirements. In certain embodiments, the current disclosure may enable a unified approach to handle the several layers of abstraction in the mapping an applications to a disk.

In most embodiments, the current disclosure may enable improved levels of data protection through policy controls and automation of protection tasks of customers' storage. In some embodiments, the current disclosure may enable replacement of a plethora of traditional IT-generated scripts and manual documented procedures.

In at least some embodiments, the current disclosure may enable the automation of storage protection. In most embodiments, the current disclosure may enable engine to orchestrate of a series of steps that create and protect storage across heterogeneous storage technologies via a varied selection of protection mechanisms.

In certain embodiments, the current disclosure may free administrators from manually creating data protection for thousands of LUNS and volumes across hundreds of systems by automating these tasks. In some embodiments, components of IT environments such as storage arrays, protection appliances, storage switches, and IP networks may be consolidated into a single framework presenting a comprehensive view of the data protection environment. In at least some embodiments, an API may provide connectivity mappings of storage arrays and protection appliances, allowing user interfaces to enforce good decision-making on the part of the requester. In alternative embodiments, a UI may masks the complexity of configuring and managing underlying tasks such as zoning, volume creation, and protection enablement. In other embodiments, an IT professional or cloud consumer may be able to implement protection of a storage environment without the burden of storage level tasks. The following may be helpful in understanding the specification and claims:

BACKUP SITE—may be a facility where replicated production site data is stored; the backup site may be located in a remote site or at the same location as the production site; a backup site may be a virtual or physical site CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system; The DPA may be a physical device, a virtual device running, or may be a combination of a virtual and physical device.

RPA—may be replication protection appliance, is another name for DPA. An RPA may be a virtual DPA or a physical DPA.

HOST—may be at least one computer or networks of computers that runs at least one data processing application that issues I/O requests to one or more storage systems; a host is an initiator with a SAN; a host may be a virtual machine HOST DEVICE—may be an internal interface in a host, to a logical storage unit;

IMAGE—may be a copy of a logical storage unit at a specific point in time;

INITIATOR—may be a node in a SAN that issues I/O requests;

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit; may also refer to one or more virtual disks or virtual LUNs, which may correspond to one or more Virtual Machines.

Management and deployment tools—may provide the means to deploy, control and manage the RP solution through the virtual environment management tools PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system; may be a virtual or physical site SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side; may be a virtual or physical site SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side; may be a virtual or physical site WAN—may be a wide area network that connects local networks and enables them to communicate with one another, such as the Internet.

SPLITTER/PROTECTION AGENT: may be an agent running either on a production host a switch or a storage array which can intercept IO and split them to a DPA and to the storage array, fail IO redirect IO or do any other manipulation to the IO; the splitter or protection agent may be used in both physical and virtual systems. The splitter may be in the IO stack of a system and may be located in the hypervisor for virtual machines. May be referred to herein as an Open Replicator Splitter (ORS).

VIRTUAL VOLUME: may be a volume which is exposed to host by a virtualization layer, the virtual volume may be spanned across more than one site and or volumes VASA: may be a set of vCenter providers that allow an administrator to manage storage Virtualization filter appliance (VFA): may be a layer in the hypervisor that has the ability intercepts and split IO from a VM being written to a virtual disk. In some embodiments, the VFA may be running on a VM in a hypervisor This is an out of mechanism that allows storage management over web based APIs.

VVOL-filter—may be a VM utilizing a specialized Virtual machine, which may provide an infrastructure that allows for introducing a "device driver" into the virtualized IO stack provided by the Virtual machine Virtual RPA (vRPA)/Virtual DPA (vDPA): may be an DPA running in a VM.

VASA may be vSphere Storage application program interfaces (APIs) for Storage Awareness.

DISTRIBUTED MIRROR: may be a mirror of a volume across distance, either metro or geo, which is accessible at all sites.

BLOCK VIRTUALIZATION: may be a layer, which takes backend storage volumes and by slicing concatenation and striping create a new set of volumes, which serve as base volumes or devices in the virtualization layer MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where all write and read IOs intercepted by the splitter are failed to the host, but other SCSI commands like read capacity are served.

GLOBAL FAIL ALL MODE: may be a mode of a volume in the virtual layer where all write and read IOs virtual layer are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partially stored on the journal.

CDP: Continuous Data Protection, may refer to a full replica of a volume or a set of volumes along with a journal which allows any point in time access, the CDP copy is at the same site, and maybe the same storage array of the production site CRR: Continuous Remote Replica may refer to a full replica of a volume or a set of volumes along with a journal which allows any point in time access at a site remote to the production volume and on a separate storage array.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, and METHODS AND APPARATUS FOR OPTIMAL JOURNALING FOR CONTINUOUS DATA REPLICATION and with U.S. Pat. No. 8,332,687, which are hereby incorporated by reference. A description of synchronous and asynchronous replication may be described in the patent titled DYNAMICALLY SWITCHING BETWEEN SYNCHRONOUS AND ASYNCHRONOUS REPLICATION and with U.S. Pat. No. 8,341,115, which is hereby incorporated by reference.

A discussion of image access may be found in U.S. patent application Ser. No. 12/969,903 entitled "DYNAMIC LUN RESIZING IN A REPLICATION ENVIRONMENT" filed on Dec. 16, 2010 assigned to EMC Corp., which is hereby incorporated by reference.

Description of Embodiments Using of a Five State Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.

Redirect the SCSI command to another logical unit.

Split the SCSI command by sending it first to the respective DPA. After the DPA returns an acknowledgement, send the SCSI command to its intended logical unit.

Fail a SCSI command by returning an error return code.

Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Figure 2:
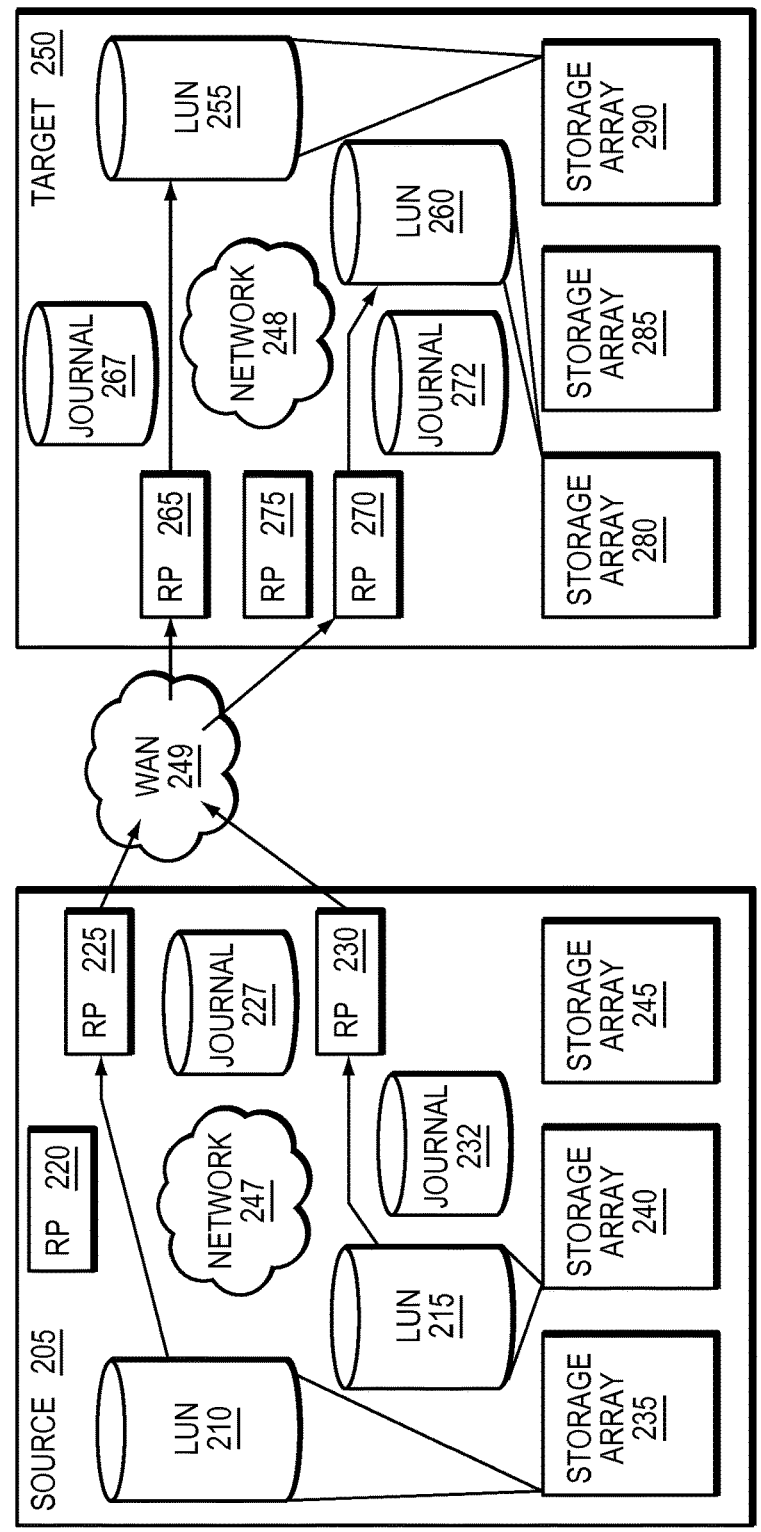
FIG. 2 is an alternative simplified illustration of a data protection system, in accordance with an embodiment of the present disclosure.

Refer now to the example embodiment of FIG. 2. The example embodiment of FIG. 2 shows a configuration for a source site and a target site, with LUNS at the source site being replicated through replication appliances to the target site. Source site 205 has LUN 210 and LUN 215. Source 205 also has replication appliance, replication appliance 225, which has journal 227, and replication appliance 230 with journal 232. LUN 210 is being replicated by replication appliance 225 and LUN 215 is being replicated by replication appliance 230. LUN 210 is stored on storage array 235 and LUN 215 is stored on storage array 240. Replication appliance 220 may be replicating a LUN on source site 205 or may be available to replicate a LUN yet to be created.

Replication appliance 225 and replication appliance 230 are replicating LUNS 210 and 215, respectively using network 247 and WAN 249 to target site 250. Replication appliance 265, which has journal 267, and replication appliance 270 with journal 272 receive IOs from replication appliances 225 and 250 on source 205 through WAN 249. Replication appliance 265 replicates LUN 210 to LUN 255 stored on storage array 280 using Network 248. Using Network 248, replication appliance 270 replicates LUN 215 on LUN 260, which is stored on storage array 285. Replication appliance 275 may be replicating a LUN or may be available to replicate a future created LUN. Conventionally, setting up the replication environment of FIG. 2 may require an IT administrator or user to take a plurality of steps.

Figure 3:
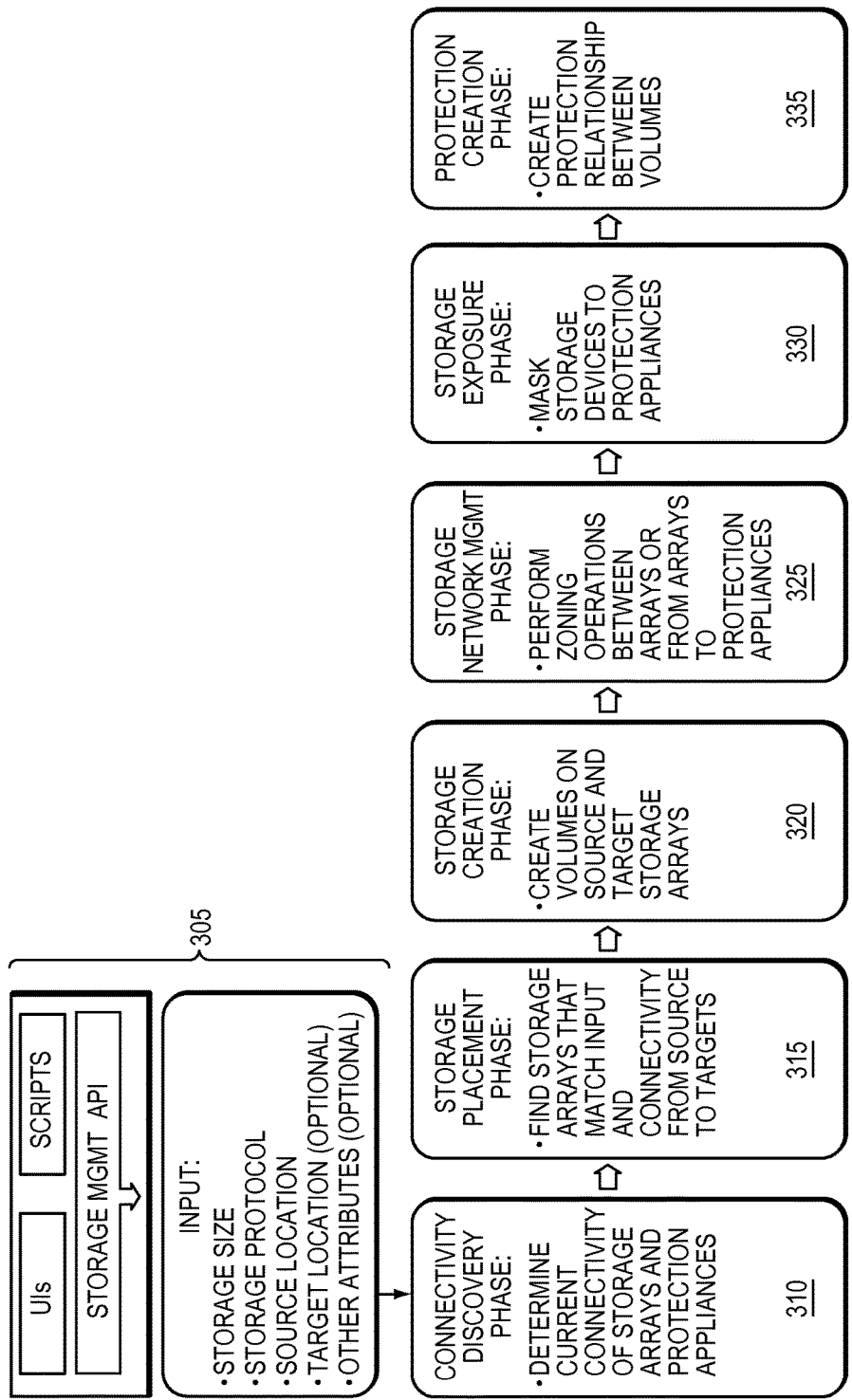
FIG. 3 is a simplified example of a method for orchestrating a workflow for an API, in accordance with an embodiment of the present disclosure.

Refer now to the example embodiment of FIG. 3, which represents an orchestration process which enables an IT administrator or use to execute a single API request, where that API requests orchestrates and performs the steps to provision and network a replicated storage volume in a data storage environment.

In the embodiment of FIG. 3, storage size, storage protocol, source location, and target location are provided as inputs to storage API 305. The orchestration API 305 then performs a series of orchestration steps to create a replicated volume. Connectivity phase 310 discovers the connectivity of storage arrays and replication appliance in a data storage environment. Storage placement phase 315 finds storage arrays that match the API request and connectivity from source to targets. Storage creation phase 320 creates volumes on the source and target arrays in response to the parameters of the API request. Storage network management phase 325 performs zoning operation from arrays to protection appliances (replication appliances). Storage expose phase 320 masks storage devices to protection appliance. Protection creation phase 335 creates a protection relationship between volumes. Note however, in certain embodiments, certain orchestration steps may be omitted as specified by API 305. In certain embodiments, the replication appliances or protection appliances may be EMC's RecoverPoint product.

Figure 4:
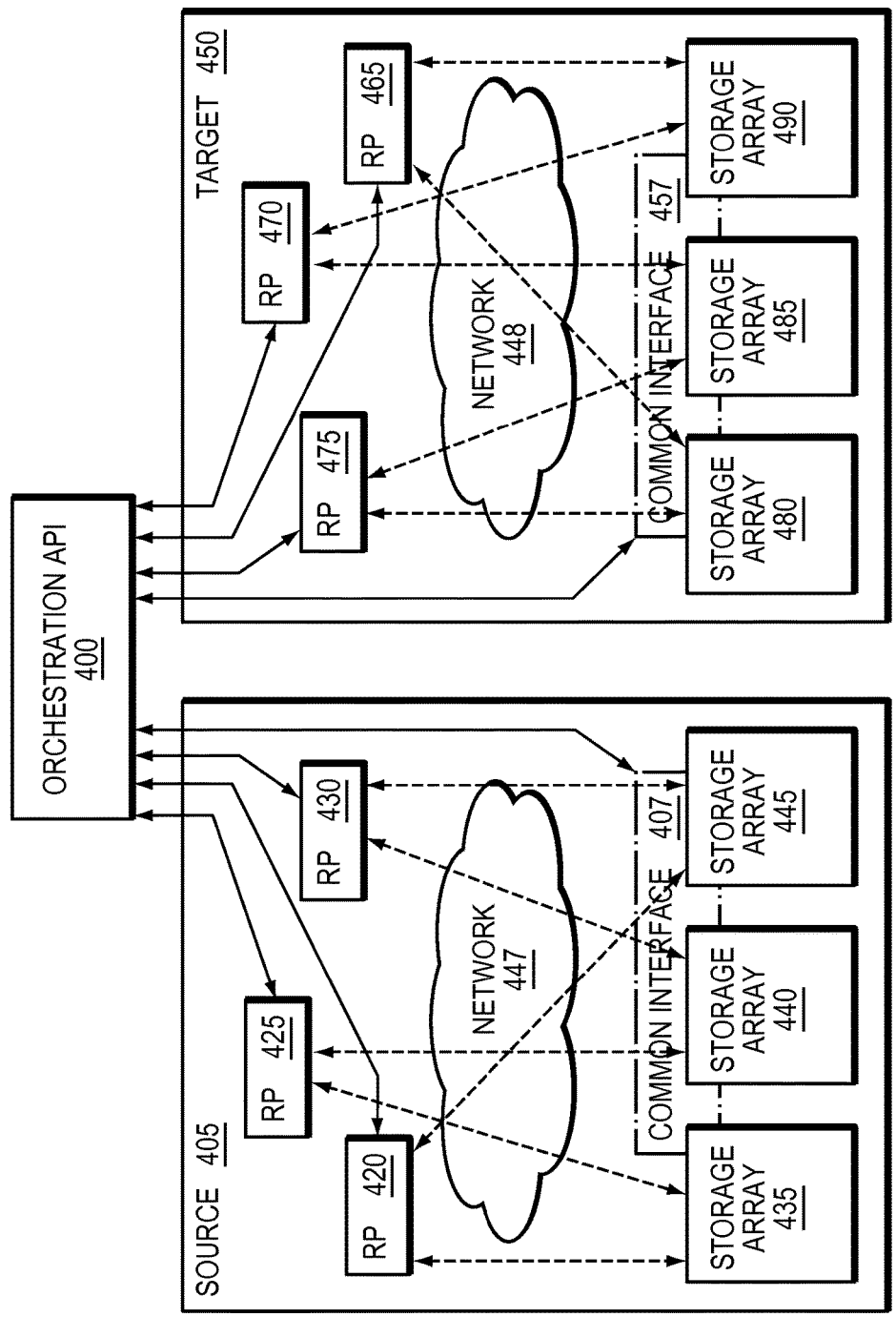
FIG. 4 is a simplified illustration of an API discovering the connectivity of a data protection system, in accordance with an embodiment of the present disclosure.
Figure 10:
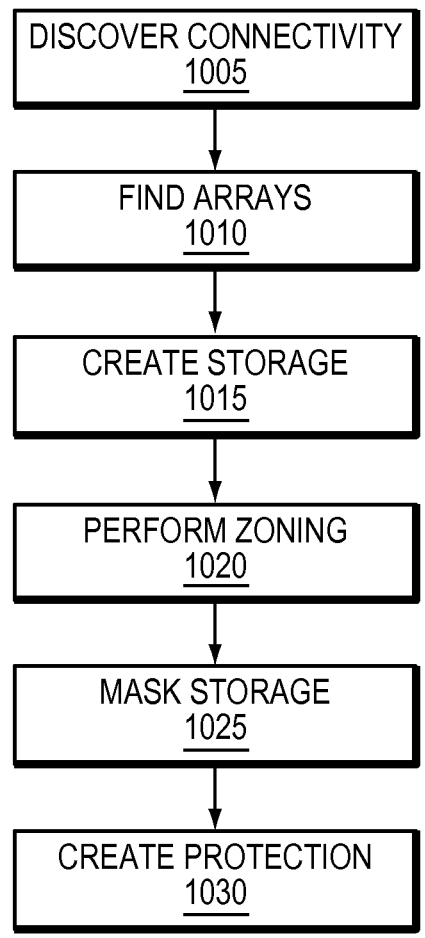
FIG. 10 is a simplified example of a method for orchestrating a workflow for an API, in accordance with an embodiment of the present disclosure.

Refer now to the example embodiments of FIGS. 4 and 10, showing orchestration API 400 discovering connectivity between storage arrays 435, 440, 445 and replication appliances 420, 425, and 430 and replication appliances 465, 470, and 475 with storage arrays 480, 485, and 490 (step 1005). In this embodiment, replication appliance 420 is connected to storage array 435 and storage array 445. Replication appliance 425 is connected to storage array 435 and 440. Replication appliance 430 is connected to storage arrays 440 and 445. Replication appliance 475 is connected to storage arrays 480 and 485. Replication storage array 470 is connected to storage arrays 480 and 490. Replication appliance 465 is connected to storage arrays 485 and 490. In the embodiment of FIG. 4, the replication appliances are connected to the storage arrays through a network, such as network 447 and network 448.

In certain embodiments, the replication appliances may be registered with orchestration API. In some embodiments, registration of the replication appliances with the orchestration API may occur during set up of the source and target sites. In most embodiments, the replication appliance may be registered before the orchestration API is invoked. In at least some embodiments, a network address, username and password may be provided during set-up of the API. In most embodiments orchestration API may contact the common interface to determine what arrays are available at the source and target.

Figure 5:
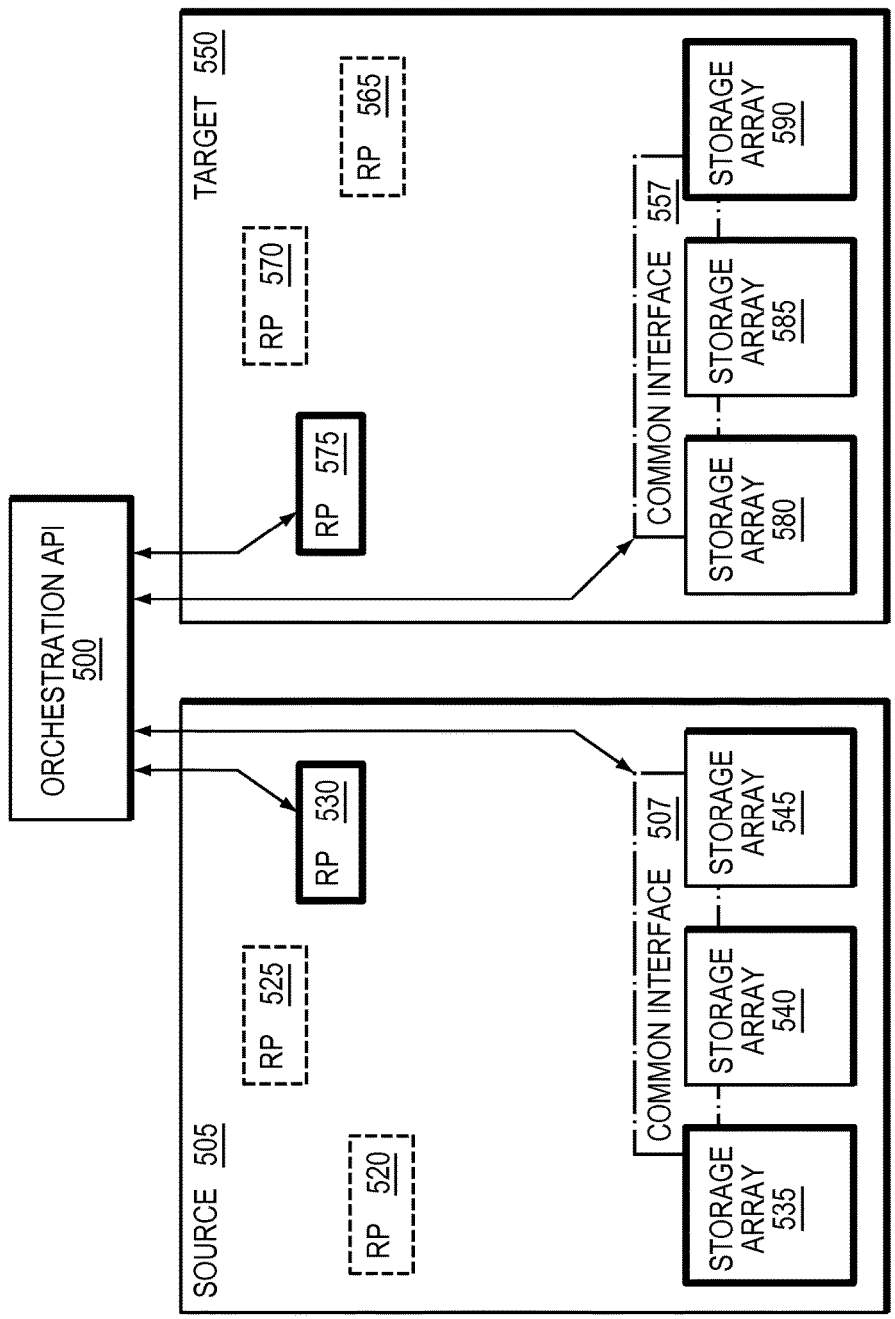
FIG. 5 is a simplified illustration of an API determining storage arrays in a data protection system that match an API request, in accordance with an embodiment of the present disclosure.

Refer now to the example embodiments of FIG. 5 and FIG. 10, which show orchestration API 500 determining which storage arrays and replication appliances satisfy the parameters of the API request (Step 1010). In the example embodiment of FIG. 5, orchestration API 500 has determined that storage array 535 and replication appliance 530 satisfy the parameters request on source 505. Orchestration API 500 has determined that replication appliance 575 and storage array on 590 satisfy the API parameters on target site 550.

Note in the embodiments of FIGS. 5 and 10 that storage arrays 540, 545, 580, and 585 and replication appliances 520, 525, 570, and 565 were found to not satisfy the storage request. In other embodiments, orchestration API may identify multiple arrays and replication appliances that may satisfy the storage request. In some embodiments, where there are multiple replication appliances or storage arrays, the orchestration API may choose the best fitting replication appliance and or storage array based on the inputted information in the API. In other embodiments, orchestration API may request further input from another API or a user to determine which replication appliance and or storage array to use. In certain embodiments, a determination may be made based on load balancing parameters to choose the best replication appliance and array.

Figure 6:
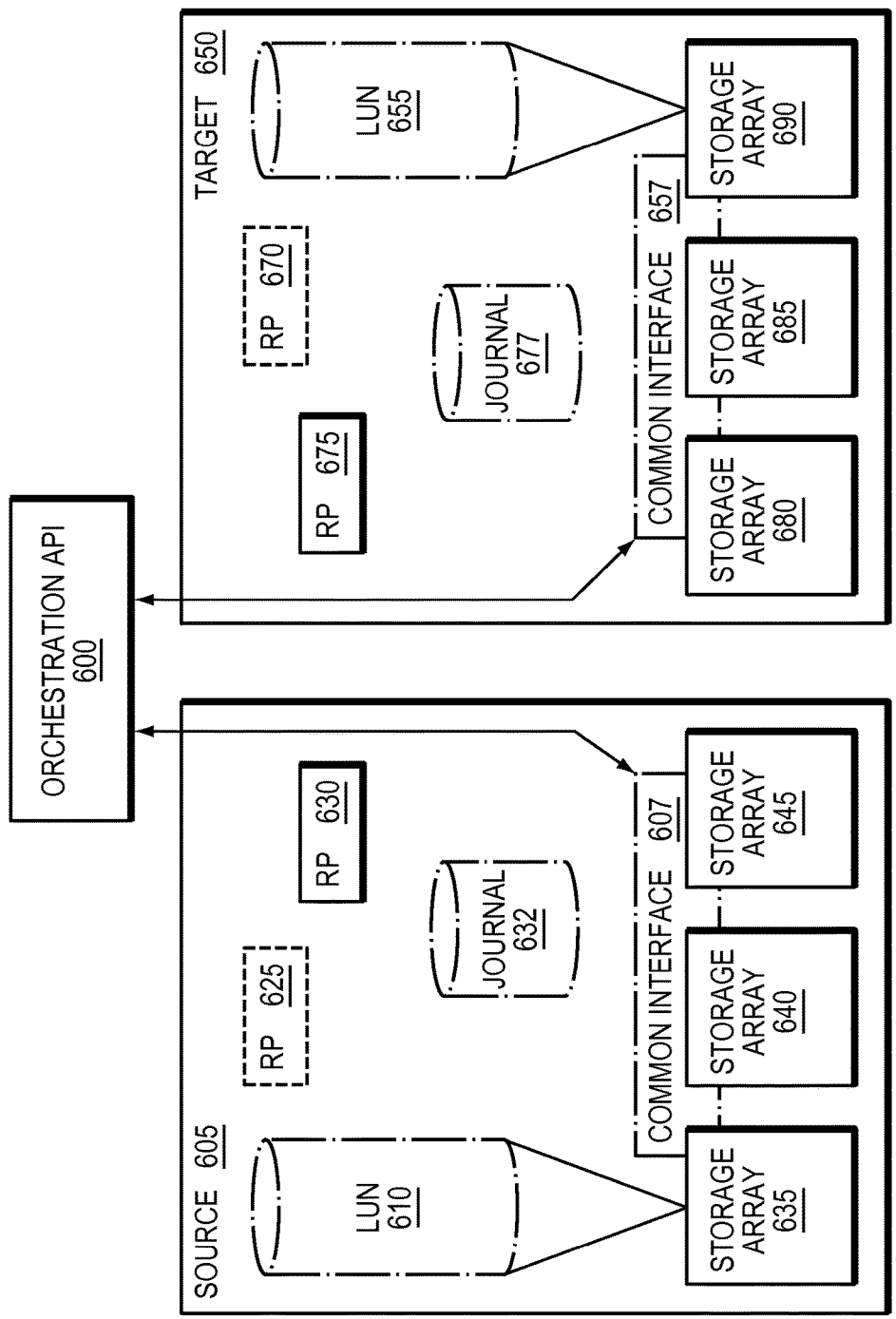
FIG. 6 is a simplified illustration of an API creating volumes on the source and target storage arrays in a data protection system that match an API request, in accordance with an embodiment of the present disclosure.

Refer now to the example embodiments of FIGS. 6 and 10, which illustrate orchestration API 600 creating storage for the request (Step 1015). Orchestration API 500 uses common interface 607 on source 605 to create LUN 610 on storage array 635. Orchestration API 600 also uses common interface 607 to create a journal for use by replication appliance 630 in replicating LUN 610. Orchestration API 600 uses common interface 657 to create LUN 655 on storage array 690 for use in replicating LUN 610. Orchestration API 600 creates journal 677 for replication appliance 675 and journal 632 for replication appliance 630. In these embodiments, replication appliances 625 and 670 may not be used for replication of LUNS 610 and 655. In some embodiments, a journal may be created on the same storage array as the LUN being replicated. In other embodiments, a journal may be created on a different storage array than the LUN being replicated. In certain embodiments, the common interface may be a Storage Management Interface system (SMIS).

Figure 7:
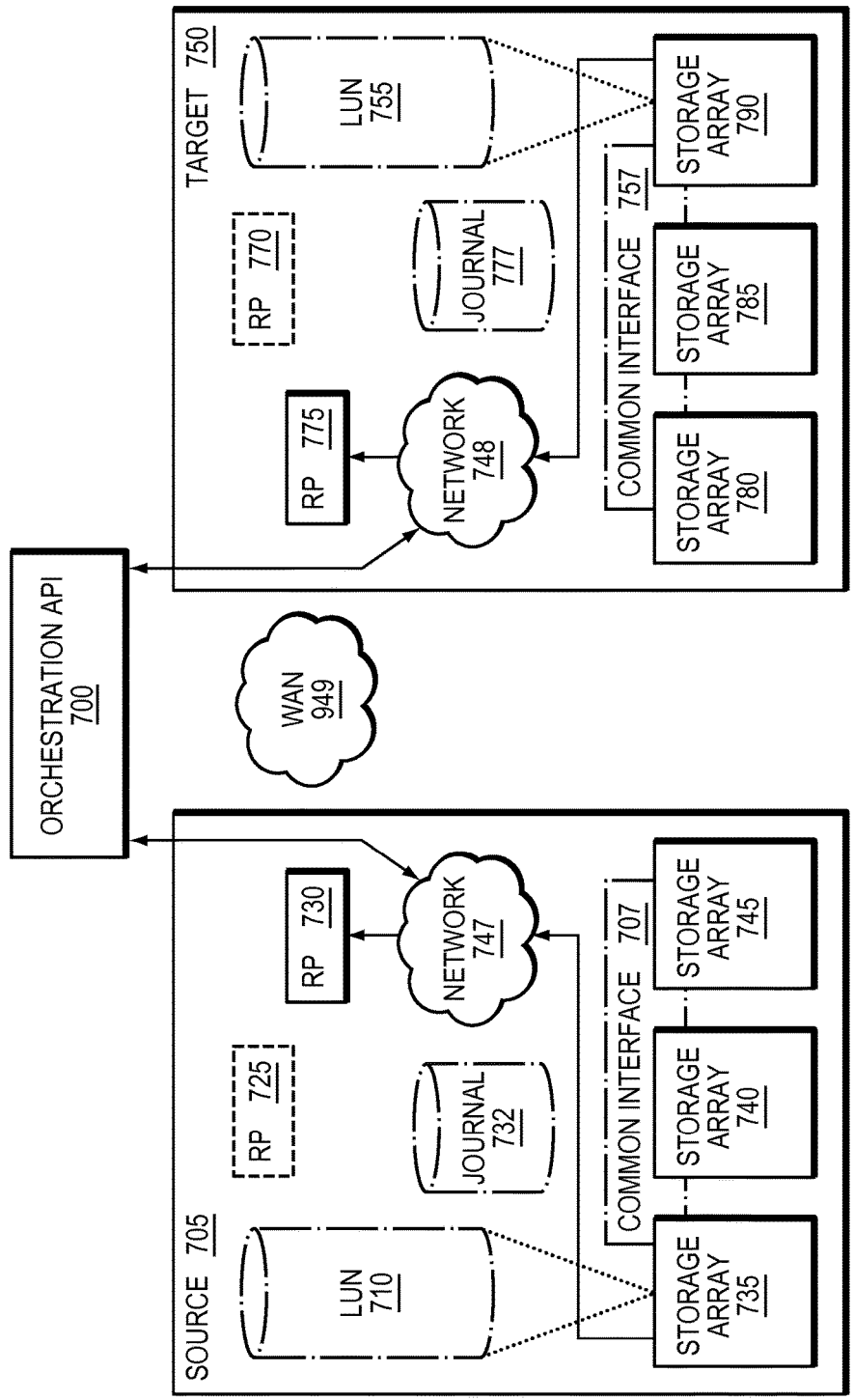
FIG. 7 is a simplified illustration of an API performing network zoning in a data protection system, in accordance with an embodiment of the present disclosure.

Refer now to the example embodiments of FIGS. 7 and 10, which illustrate orchestration API 700 performing zoning (step 1020). In these embodiments, orchestration API 700 uses network 747 to ensure that storage array 735 can communicate with replication appliance 730, that replication appliance 775 can communicate with storage array 790. In certain embodiments, orchestration API may be enabled to create connectivity between replication appliances and storage arrays. In some embodiments, the orchestration API's ability to create connectivity may depend on whether one or more switches are in the source and target environments.

Figure 8:
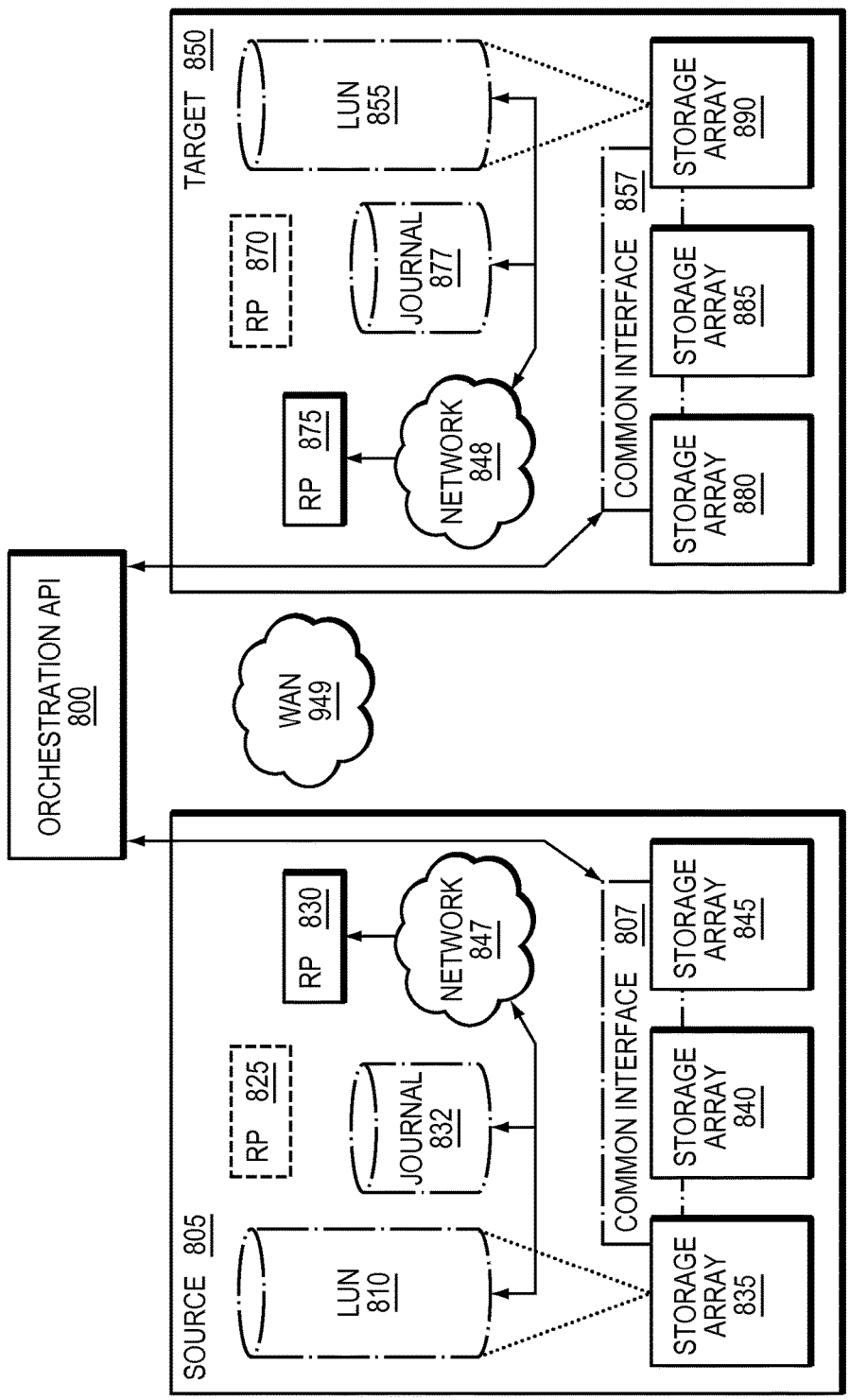
FIG. 8 is a simplified illustration of an API masking storage devices in a data protection system, in accordance with an embodiment of the present disclosure.

Refer now to the example embodiments of FIGS. 8 and 10, which illustrate orchestration API 800 masking storage (step 1025). In these embodiments, orchestration API ensures that replication appliance 830 can communicate with LUN 810 and that replication appliance 875 can communicate with LUN 855. In certain embodiments, masking may add the LUNS into a storage group. In certain embodiments, ports of a replication appliance may be married to the LUN on the array.

Figure 9:
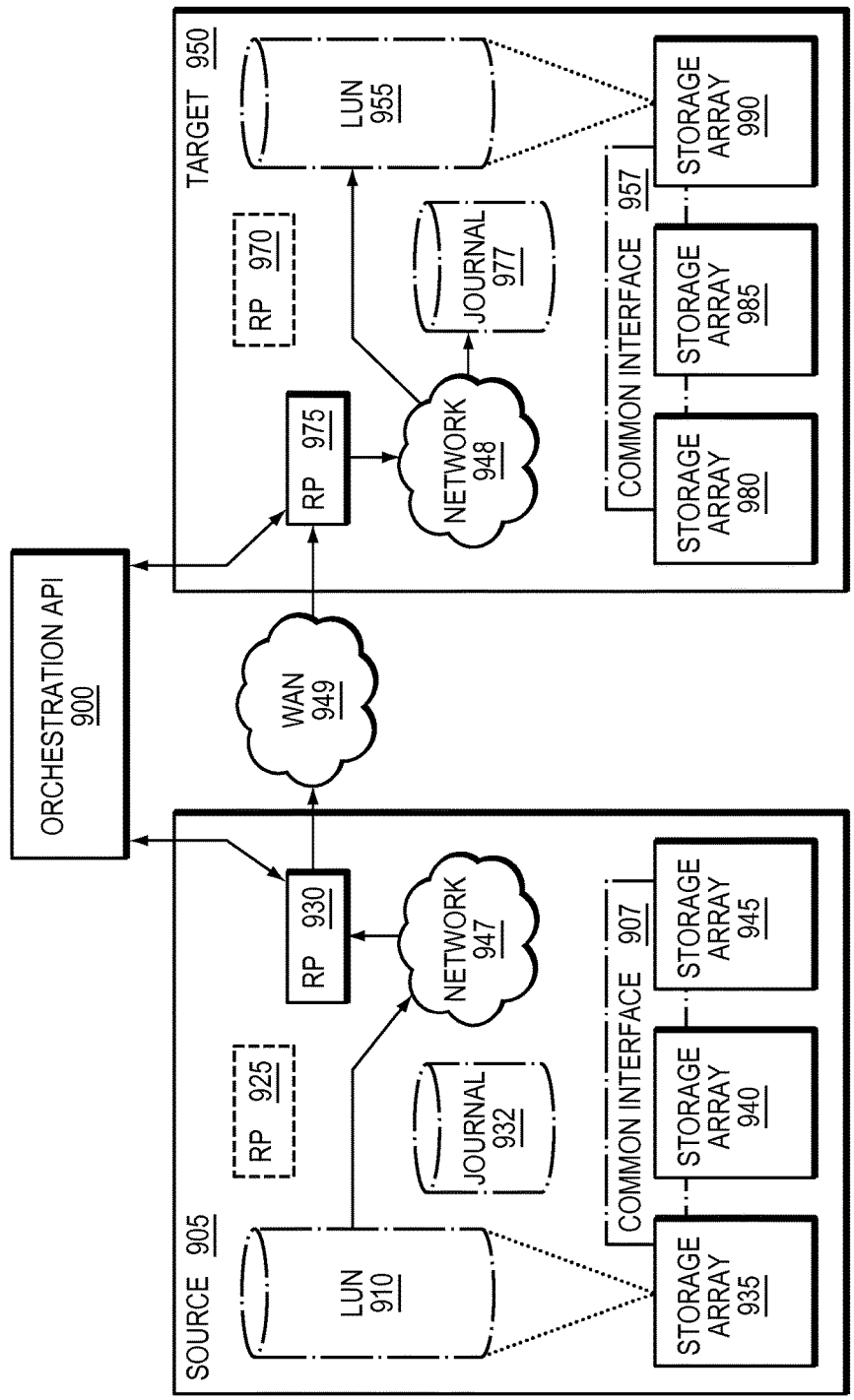
FIG. 9 is a simplified illustration of an API creating a protection relationship between volumes in a data protection system, in accordance with an embodiment of the present disclosure.

Refer now to the example embodiments of FIGS. 9 and 10, which illustrate orchestration API 900 creating protection for storage (step 1030). In these figures, orchestration API ensures that IOs to LUN 910 are split to replication appliance 930, IO from replication appliance 930 is sent to replication appliance 975, and that replication appliance 975 replicates the IO to LUN 955.

In further embodiments, an orchestration API may be part of a larger API or coordination API. In some embodiments, an orchestration API may request input from a large API or Orchestration engine. In other embodiments, an orchestration API may request input from a user. In still further embodiments, an orchestration API may be one of a set of other orchestration APIs, wherein each of the set of orchestration APIs offer different orchestration functionality. In of these embodiments, the set of orchestration APIs may be combined with an overall Orchestration or Engine layer which may coordinate requests between the set of orchestration APIs.

Figure 11:
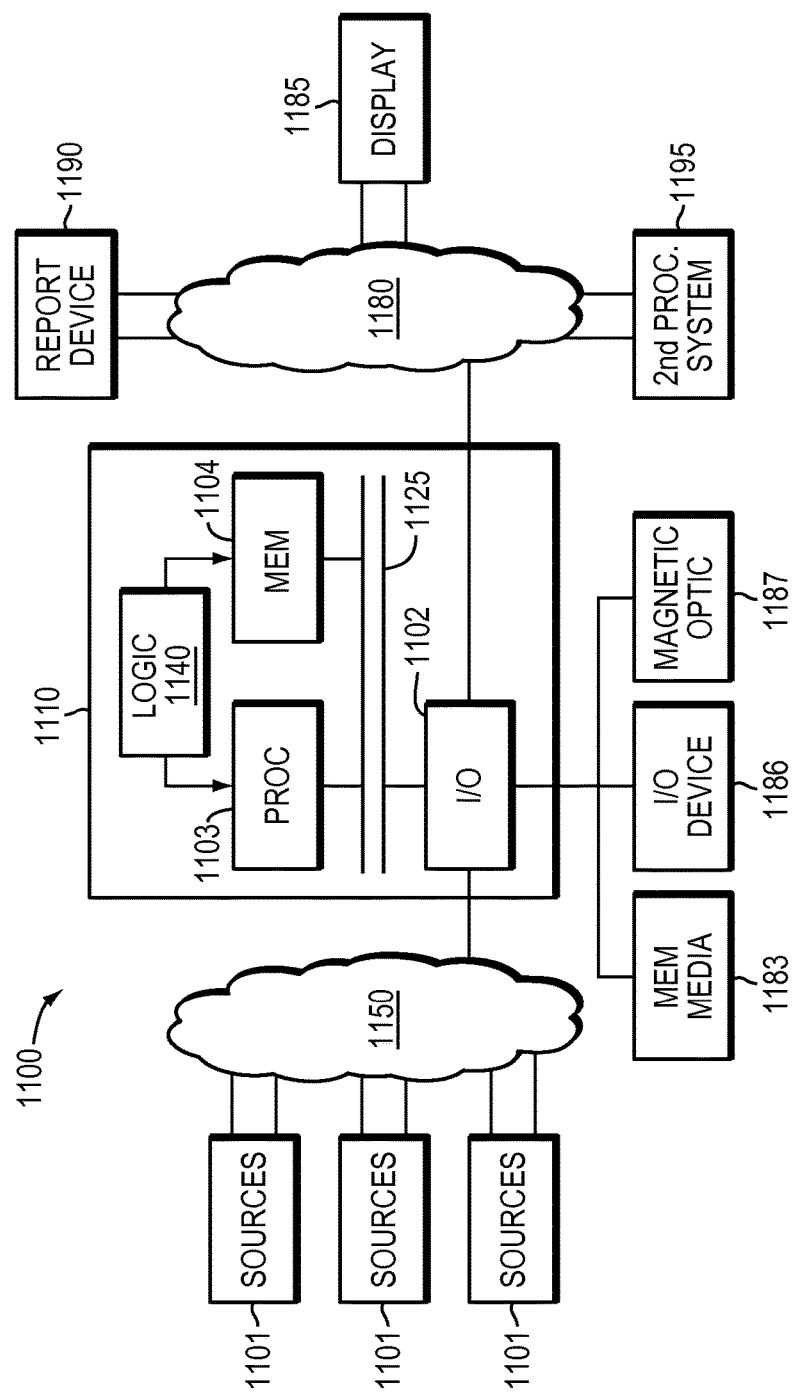
FIG. 11 is an example of an embodiment of an apparatus that may utilize the techniques described herein, in accordance with an embodiment of the present disclosure.
Figure 12:
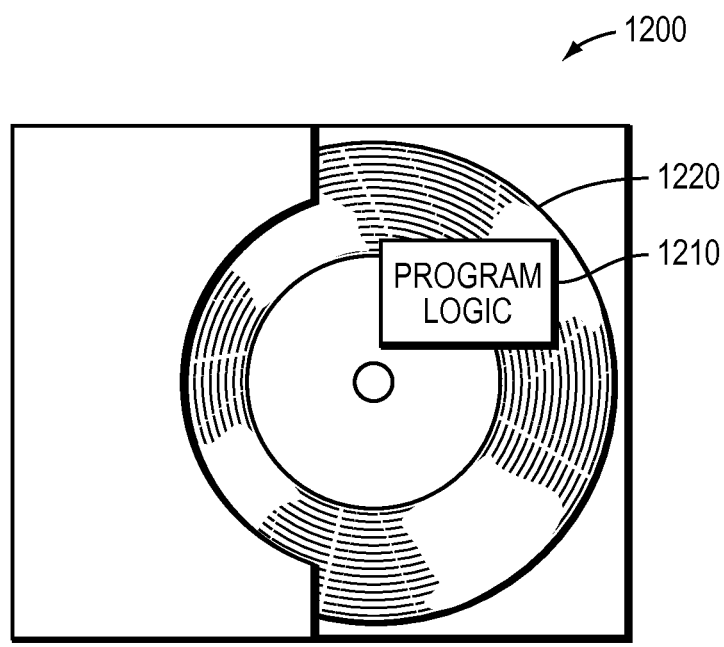
FIG. 12 is an example of a method embodied on a computer readable storage medium that may utilize the techniques described herein, in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 11 the machine becomes an apparatus for practicing the invention. When implemented on one or more general-purpose processors, the program code combines with such a processor 1103 to provide a unique apparatus that operates analogously to specific logic circuits. As such a general purpose digital machine can be transformed into a special purpose digital machine. FIG. 12 shows Program Logic 1234 embodied on a computer-readable medium 1230 as shown, and wherein the Logic is encoded in computer-executable code configured for carrying out the reservation service process of this invention and thereby forming a Computer Program Product 1200. The logic 1234 may be the same logic 1140 on memory 1104 loaded on processor 1103. The program logic may also be embodied in software modules, as modules, or as hardware modules.

The logic for carrying out the method may be embodied as part of the system described below, which is useful for carrying out a method described with reference to embodiments shown in, for example, FIG. 3 and FIG. 10. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A system for storage provisioning in a data storage environment, the system comprising:
   an orchestration API; and
   computer-executable program code operating in memory coupled with a processor in communication with a database, wherein the computer-executable program code is configured to enable a processor to execute logic to enable:
   receiving, through the orchestration API, a request to create a replicated volume, wherein the request comprises a source volume size, a source site, and a source volume protocol, wherein the source site indicates a location at which an uncreated source volume is to be created;
   based on the request, protecting, through the orchestration API, a source volume at the source site by setting the source volume to be replicated to a target volume at a target site through the use of a replication appliance; wherein the API is enabled to create network zones between the source site and the target site for replication from the source site to the target site and wherein the network zone is configured to include the replication appliance; wherein the API is enabled to mask storage devices used to store data on the source volume and the target volume to a respective replication appliance cluster node.

2. The system of claim 1 wherein the orchestration API is enabled to:
   determine connectivity of one or more replication appliances, wherein the replication appliances include the replication appliance, and storage arrays; wherein at least a first storage array of the storage arrays is on the source site and wherein at least a second storage array of the storage arrays is on the target site; and wherein the storage arrays comprise the storage devices; and
   determine configurations of the one or more storage arrays and one or more replication volumes to match an API request for protecting the source volume with the target volume inputted to the orchestration API.

3. The system of claim 2 wherein the orchestration API is enabled to create the source volume on the first storage array and creating the target volume on the target site by interacting with the first storage array on the source site and the second storage array on the target site through a common storage interface.

4. The system of claim 3 wherein an API request to create a replicated volume with a set of parameters is enabled to function with a required set of parameters consisting essentially of the storage size, storage protocol, and source location.

5. The system of claim 2 wherein the orchestration API is enabled to determine a best set of the configurations of the one or more storage arrays and one or more replication volumes; wherein if the best set is a set of one the orchestration API uses that configuration for the replication; and wherein if the best set has multiple configurations requesting input as to which configuration to use in the replication.

6. The system of claim 4 wherein the API request is enabled to function with a set of parameters including a target site; wherein a determination is made whether the target site has been included in the API request; and wherein the API is enabled to choose the target site based on a negative determination of target site included.

7. A computer implemented method comprising:
   receiving, through an orchestration API, a request to create a replicated volume, wherein the request comprises a source volume size, a source site, and a source volume protocol, wherein the source site indicates a location at which an uncreated source volume is to be created;
   based on the request, protecting, through the orchestration API, a source volume at the source site by setting the source volume to be replicated to a target volume at a target site through the use of a replication appliance; wherein the API is enabled to create network zones between the source site and the target site for replication from the source site to the target site and wherein the network zone is configured to include the replication appliance; wherein the API is enabled to mask storage devices used to store data on the source volume and the target volume to a respective replication appliance cluster node.

8. The method of claim 1 further comprising:
   determining connectivity of one or more replication appliances, wherein the replication appliances include the replication appliance, and storage arrays; wherein at least a first storage array of the storage arrays is on the source site and wherein at least a second storage array of the storage arrays is on the target site; and wherein the storage arrays comprise the storage devices; and
   determining configurations of the one or more storage arrays and one or more replication volumes to match an API request for protecting the source volume with the target volume inputted to the orchestration API.

9. The method of claim 2 wherein the orchestration API is enabled to create the source volume on the first storage array and creating the target volume on the target site by interacting with the first storage array on the source site and the second storage array on the target site through a common storage interface.

10. The method of claim 3 wherein an API request to the orchestration API to create a replicated volume with a set of parameters is enabled to function with a required set of parameters consisting essentially of the storage size, storage protocol, and source location.

11. The method of claim 2 wherein the orchestration API is enabled to determine a best set of the configurations of the one or more storage arrays and one or more replication volumes; wherein if the best set is a set of one the orchestration API uses that configuration for the replication; and wherein if the best set has multiple configurations requesting input as to which configuration to use in the replication.

12. The method of claim 4 wherein the API request is enabled to function with a set of parameters including a target site; wherein a determination is made whether the target site has been included in the API request; and wherein the API is enabled to choose the target site based on a negative determination of target site included.

13. A computer program product comprising:
a non-transitory computer readable medium encoded with computer executable program, the code enabling:
receiving, through an orchestration API, a request to create a replicated volume, wherein the request comprises a source volume size, a source site, and a source volume protocol, wherein the source site indicates a location at which an uncreated source volume is to be created;
based on the request, protecting, through the orchestration API, a source volume at the source site by setting the source volume to be replicated to a target volume at a target site through the use of a replication appliance; wherein the API is enabled to create network zones between the source site and the target site for replication from the source site to the target site and wherein the network zone is configured to include the replication appliance; wherein the API is enabled to mask storage devices used to store data on the source volume and the target volume to a respective replication appliance cluster node.

14. The computer program product of claim 13, wherein the code further enables:
determining connectivity of one or more replication appliances, wherein the replication appliances include the replication appliance, and storage arrays; wherein at least a first storage array of the storage arrays is on the source site and wherein at least a second storage array of the storage arrays is on the target site; and wherein the storage arrays comprise the storage devices; and
determining configurations of the one or more storage arrays and one or more replication volumes to match an API request for protecting the source volume with the target volume inputted to the orchestration API.

15. The computer program product of claim 14 wherein the orchestration API is enabled to create the source volume on the first storage array and creating the target volume on the target site by interacting with the first storage array on the source site and the second storage array on the target site through a common storage interface.

16. The computer program product of claim 15 wherein an API request to the orchestration API to create a replicated volume with a set of parameters is enabled to function with a required set of parameters consisting essentially of the storage size, storage protocol, and source location.

17. The computer program product of claim 14 wherein the orchestration API is enabled to determine a best set of the configurations of the one or more storage arrays and one or more replication volumes; wherein if the best set is a set of one the orchestration API uses that configuration for the replication; and wherein if the best set has multiple configurations requesting input as to which configuration to use in the replication.

18. The computer program product of claim 16 wherein the API request is enabled to function with a set of parameters including a target site; wherein a determination is made whether the target site has been included in the API request; and wherein the API is enabled to choose the target site based on a negative determination of target site included.

* * * * *